United States Patent
Komiya (10) Patent No.: US 9,853,493 B2
(45) Date of Patent: Dec. 26, 2017

(54) ELECTRONIC DEVICE AND ELECTRONIC-DEVICE CONTROL METHOD

(71) Applicant: FUJITSU LIMITED, Kawasaki-shi, Kanagawa (JP)

(72) Inventor: Kazuki Komiya, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 131 days.

(21) Appl. No.: 15/079,642

(22) Filed: Mar. 24, 2016

(65) Prior Publication Data
US 2016/0352140 A1    Dec. 1, 2016

(30) Foreign Application Priority Data
May 26, 2015    (JP) .................. 2015-106762

(51) Int. Cl.
H02J 7/00    (2006.01)
H02J 9/00    (2006.01)
H02J 9/06    (2006.01)

(52) U.S. Cl.
CPC .................... *H02J 9/06* (2013.01)

(58) Field of Classification Search
USPC .......................................... 307/64; 320/162
See application file for complete search history.

(56) References Cited

U.S. PATENT DOCUMENTS

| | | | |
|---|---|---|---|
| 5,625,237 A | 4/1997 | Saeki et al. | |
| 7,675,265 B2* | 3/2010 | Mori | H02J 7/0055 320/110 |
| 8,274,395 B1* | 9/2012 | Erickson | G06F 11/3013 320/119 |
| 9,293,930 B2* | 3/2016 | Ikeuchi | H01M 10/48 |
| 9,312,723 B2* | 4/2016 | Nagata | H02J 7/0072 |
| 9,661,777 B2* | 5/2017 | Mills | H05K 7/1492 |
| 2007/0210893 A1* | 9/2007 | Hasunuma | H01M 2/34 338/25 |
| 2008/0080220 A1* | 4/2008 | Mehta | H02M 7/53803 363/97 |
| 2009/0009143 A1* | 1/2009 | Odaohhara | H02J 7/0026 320/162 |
| 2009/0058370 A1* | 3/2009 | Odaohhara | H01M 10/441 320/152 |
| 2009/0085527 A1* | 4/2009 | Odaohhara | H02J 7/0091 320/150 |

(Continued)

FOREIGN PATENT DOCUMENTS

| | | |
|---|---|---|
| JP | 08-140289 | 5/1996 |
| JP | 2003-087994 | 3/2003 |
| JP | 2006-101595 | 4/2006 |

*Primary Examiner* — Adam Houston
(74) *Attorney, Agent, or Firm* — Fujitsu Patent Center (57) ABSTRACT

A diode is provided in a first supply route for the electric power from an AC adaptor, rectifies the current from the AC adaptor and, at the output side thereof, is connected to a second supply route for the electric power from an AC adaptor. A detecting unit is connected to the input side of the diode in the first supply route and, based on the voltage that is input from the first supply route, detects whether the AC adaptor is connected. A resistance control unit reduces the combined resistance between the ground and the input side of the diode when the temperature of the device, including the diode, is equal to or more than a predetermined temperature.

4 Claims, 6 Drawing Sheets

(56) References Cited

U.S. PATENT DOCUMENTS

| | | | | |
|---|---|---|---|---|
| 2010/0254162 A1* | 10/2010 | Lanni | ............... | H02M 1/10 |
| | | | | 363/15 |
| 2012/0235488 A1* | 9/2012 | Hamanaka | ............... | H02M 1/32 |
| | | | | 307/64 |
| 2014/0247522 A1* | 9/2014 | Simi | ............... | H05B 33/0884 |
| | | | | 361/18 |
| 2015/0028877 A1* | 1/2015 | McCormick | ............... | H01H 47/002 |
| | | | | 324/418 |
| 2015/0048804 A1* | 2/2015 | Toivanen | ............... | H02J 7/0036 |
| | | | | 320/162 |
| 2016/0204630 A1* | 7/2016 | Lee | ............... | H02H 7/18 |
| | | | | 320/112 |
| 2016/0204631 A1* | 7/2016 | Houston | ............... | H02J 7/0029 |
| | | | | 320/162 |
| 2016/0254681 A1* | 9/2016 | Choi | ............... | H02J 7/007 |
| | | | | 320/162 |
| 2016/0352140 A1* | 12/2016 | Komiya | ............... | H02J 9/06 |
| 2017/0179740 A1* | 6/2017 | Li | ............... | H02J 7/0029 |

* cited by examiner

ELECTRONIC DEVICE AND ELECTRONIC-DEVICE CONTROL METHOD

CROSS-REFERENCE TO RELATED APPLICATION

This application is based upon and claims the benefit of priority of the prior Japanese Patent Application No. 2015-106762, filed on May 26, 2015, the entire contents of which are incorporated herein by reference.

FIELD

The embodiment discussed herein is related to an electronic device and an electronic-device control method.

BACKGROUND

In recent years, portable electronic devices, such as notebook personal computers, have been widely used. This type of portable electronic device is often operated by using a built-in battery, or the like, and it is not always connected to an external power source unlike stationary electronic devices. Therefore, portable electronic devices are connected to an external power source, such as an alternating-current (AC) adapter, to receive the electric power that is supplied from outside.

The above-described portable electronic device is sometimes configured to use an internal comparator so as to determine whether an AC adapter is connected. In the case of the configuration for determining whether an AC adapter is connected or not by using a comparator, it is preferable to prevent false detection as to whether an AC adapter is connected or not due to the current flowing into the comparator from other than the AC adapter. Therefore, a diode is often provided as a rectifying device of the power source line at an area after bifurcation of the route for supplying the current to the comparator in the supply route from the AC adapter. As the diode flows large current, the Schottky barrier diode is often used, which has less voltage drop in the forward direction.

Furthermore, for some of the above-described portable electronic devices, there are expansion units for the purpose of functionality expansion, or the like. Some of the expansion units are configured to receive the electric power from an external unit. Therefore, if a portable electronic device is connected to the expansion unit that receives the electric power that is supplied from an external unit, it may use the expansion unit as an external power source. In this case, the electric-power supply route from the expansion unit is often different from the electric-power supply route from the AC adapter.

As described above, some of the portable electronic devices have, as the route for supplying the electric power from an external unit, a route other than the route that uses an AC adapter as the external power source. In the case of portable electronic devices that have the electric-power supply route from an external power source other than an AC adapter, if the current, supplied from a different external power source, flows into the comparator that determines whether the AC adapter is connected or not, there is a possibility that the AC adapter is improperly detected.

Here, the Schottky barrier diode prevents the flow of the current into the comparator from other than the AC adapter and, due to its characteristics, it has large leak current when the voltage is applied in the backward direction. Furthermore, it is known that, if the temperature increases, the leak current of the Schottky barrier diode increases by about ten to hundred times.

Therefore, if a different external power source is connected without attaching an AC adapter, the voltage is applied to the Schottky barrier diode from the different external power source, and the leak current occurs. Particularly, if the temperature is high, more leak currents occur, and a high voltage is applied to the comparator, which may result in false detection of the AC adapter.

Here, the level of the leak voltage, which occurs due to the leak current, is represented by using the value that is obtained by multiplying the leak current by the impedance of the anode side of the Schottky barrier diode relative to the ground (GND). Specifically, if the impedance of the anode side of the Schottky barrier diode relative to the GND is decreased, the leak voltage may be reduced. Thus, it is considered that, in order to decrease the impedance, the resistance between the anode of the Schottky barrier diode and the ground is reduced.

According to a conventional technology, as the measures against the above-described leak current, in the configuration where an AC adapter and a battery are provided to the system side by being OR-connected by diodes, a battery-connection detection terminal is separately provided so as to prevent false detection of the voltage due to the leak current from the AC adapter. Furthermore, according to a conventional technology, in the configuration where the voltage sources in dual system are OR-connected, the same type of diode is used as the sink source for the leak current so as to prevent false voltage detection due to the leak current of a diode in the high-voltage environment. Furthermore, there is a conventional technology where, in the circuit where an AC adapter and a battery are OR-connected by diodes, the sink current in the circuit, which consumes the leak current of the diode, is changed in accordance with the temperature.

Japanese Laid-open Patent Publication No. 08-140289
Japanese Laid-open Patent Publication No. 2006-101595
Japanese Laid-open Patent Publication No. 2003-87994

However, in order to set a low resistance, if the leak current at the high temperature is about 1 mA to 10 mA, it is possible to use the resistor with a low resistance value, e.g., 10Ω to 1 kΩ, so as to ensure its operation at the high temperature. In a case where such a resistor is used, if an operation is performed with the AC adapter of, for example, 20 V, an high standby electricity of 4 W to 400 mW occurs. This high standby electricity does not meet the standby electricity regulation, such as Energy related Product (Erp) regulation.

For example, the ErP regulation defines that the standby electricity at the primary side is equal to or less than 500 mW if an AC adapter is connected to the computer whose power source is mechanically turned off while there are no charges. Here, the efficiency of an AC adapter during low loads is about 50%. Therefore, the loss at the computer side is kept at equal to or less than 250 mW. Here, if the threshold for detecting an adapter is 15 V and if the leak current of the used diode at the high temperature reaches 4 mA, the impedance is kept at 15/4=3.75 kΩ). At least the loss due to this resistance causes the loss of 20×20/3.75=107 mW, and almost 40% of the standby electricity margin is lost. Therefore, if the resistor with a low resistance value is used, it is difficult to satisfy the condition for the loss at the computer side, and it is difficult to meet the standby electricity regulation.

Furthermore, in the case of application of the conventional technology for separately providing a detection terminal, new designing and manufacturing for the detection terminal are conducted, which results in an increase in costs and complexity of the manufacturing process. Furthermore, in the case of the conventional technology that uses the diode as the sink source for the leak current, there are few products that include multiple diodes, and new designing and manufacturing are needed, which results in an increase in costs. Furthermore, according to this conventional technology, the size of the substrate is bigger, and there is a possibility that it is difficult to install it in the computer. Furthermore, in the case of the conventional technology of changing the sink current in the circuit, which consumes the leak current of the diode, in accordance with the temperature, in order to switch the consumption circuit, the voltage after the OR connection is detected and is compared with a threshold. This method is unusable unless the condition is such that there is a difference in the voltage between the AC adapter and a different power source, and it is difficult to use it for multiple external power sources. Furthermore, according to this conventional technology, the sink current is not stepwise with regard to the temperature; therefore, when the leak current increases in an exponential fashion, if the consumption circuit is selected in accordance with the high temperature, there is a possibility that the sink current at the normal temperature becomes too high.

SUMMARY

According to an aspect of an embodiment, an electronic device includes: a rectifying device that is provided in a first supply route for an electric power from a first external power source, rectifies a current from the first external power source and, at an output side thereof, is connected to a second supply route for an electric power from a second external power source; a detecting unit that is connected to an input side of the rectifying device in the first supply route and, based on a voltage that is input from the first supply route, detects whether the first external power source is connected; and a resistance control unit that reduces a combined resistance between a ground and the input side of the rectifying device when a temperature of a device, including the rectifying device, is equal to or more than a predetermined temperature.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Here, the electronic device and the electronic-device control method, disclosed in the subject application, are not limited to the following embodiment.

Figure 1:
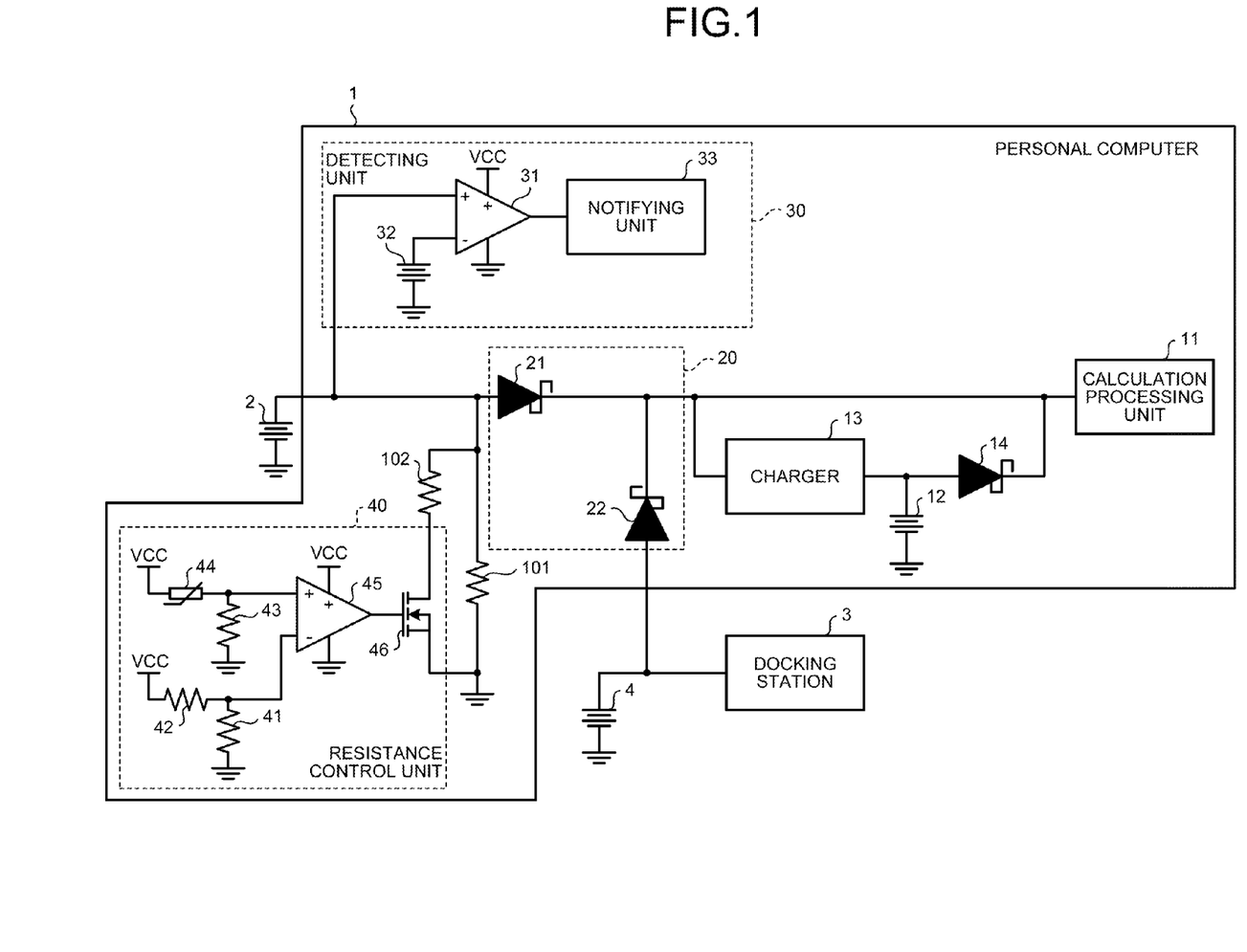
FIG. 1 is a circuit configuration diagram of a personal computer according to an embodiment.

FIG. 1 is a circuit configuration diagram of a personal computer according to the embodiment. As illustrated in FIG. 1, a system according to the present embodiment includes a personal computer (PC) 1, an AC adapter 2, a docking station 3, and an AC adapter 4. FIG. 1 illustrates the state where the PC 1 is connected to the AC adapter 2 and the docking station 3. Furthermore, the docking station 3 is connected to the AC adapter 4 so as to receive the electric power that is supplied from the AC adapter 4.

The AC adapter 2 receives the alternating-current electricity that is supplied from the primary power source, such as a home outlet. Furthermore, the AC adapter 2 converts the alternating-current electricity into the direct current, reduces the voltage, and outputs it. The AC adapter 2 outputs, for example, the direct-current electricity that has a voltage of 20 V. The AC adapter 2 is an example of a "first external power source".

The docking station 3 is an expansion unit that includes, for example, a keyboard. Furthermore, the docking station 3 supplies the electric power, fed from the AC adapter 4, to the PC 1.

According to the present embodiment, the AC adapter 4 has the same functionality as that of the AC adapter 2. The AC adapter 4 supplies the electric power to the PC 1 via the docking station 3. However, for the convenience of the following explanations, it is sometimes explained that the electric power is directly supplied from the AC adapter 4 to the PC 1. The AC adapter 4 is an example of a "second external power source".

The PC 1 includes a calculation processing unit 11, a battery 12, a charger 13, a diode 14, a diode OR circuit 20, a detecting unit 30, a resistance control unit 40, a resistor 101, and a resistor 102.

The calculation processing unit 11 includes, for example, a central processing unit (CPU), a memory, and a hard disk. Furthermore, the calculation processing unit 11 may include a liquid crystal screen, an input mechanism, or the like. Moreover, the calculation processing unit 11 performs a calculation operation when it receives an input from an operator, or the like. The calculation processing unit 11 operates due to the electric power that is supplied from any of the AC adapter 2, the AC adapter 4, and the battery 12.

The battery 12 is a built-in battery of the PC 1. If the PC 1 does not receive the electric power that is supplied from the AC adapters 2 and 4, the battery 12 supplies the electric power to the calculation processing unit 11.

The charger 13 receives an input of the electric power that is supplied from the AC adapter 2 or 4. Furthermore, the charger 13 reduces the voltage of the received electric power to the voltage for charging the battery 12. Then, the charger 13 feeds the electricity with the reduced voltage to the battery 12 so as to charge the battery 12.

The diode 14 is a rectifying device that is provided on the electric-power supply route from the battery 12 to the calculation processing unit 11. Furthermore, the diode 14 supplies the electricity, output from the battery 12, to the calculation processing unit 11. Moreover, the diode 14 prevents the electricity from flowing into the battery 12 through the electric-power supply route.

In the diode OR circuit 20, the electric-power supply routes from the AC adapters 2 and 4 meet each other. If the AC adapter 2 is connected to the PC 1 and the AC adapter 4 is not connected to it, the diode OR circuit 20 supplies the electric power, fed from the AC adapter 2, to the calculation processing unit 11. Furthermore, if the AC adapter 4 is connected to the PC 1 and the AC adapter 2 is not connected to it, the diode OR circuit 20 supplies the electric power, fed from the AC adapter 4, to the calculation processing unit 11. Moreover, if both the AC adapters 2 and 4 are connected to the PC 1, the diode OR circuit 20 supplies the electric power with a higher voltage to the calculation processing unit 11.

Hereafter, a detailed explanation is given of the diode OR circuit 20. The diode OR circuit 20 includes a diode 21 and a diode 22. Diodes that flow high current are used as the diodes 21 and 22. For example, the diodes 21 and 22 are Schottky barrier diodes.

The diode 21 is a rectifying device. The diode 21 is provided on the electric-power supply route from the AC adapter 2 to the calculation processing unit 11, and it is on the side of the AC adapter 2 from the intersection point with the electric-power supply route from the AC adapter 4. In the diode 21, the anode-side terminal is provided to face the AC adapter 2, and the cathode-side terminal is provided to face the calculation processing unit 11. That is, the diode 21 flows currents from the side of the AC adapter 2 to the calculation processing unit 11, and it prevents currents from flowing from the side of the calculation processing unit 11 to the AC adapter 2. The electric-power supply route from the AC adapter 2 to the calculation processing unit 11 via the diode 21 is an example of a "first supply route".

The diode 22 is a rectifying device. The diode 22 is provided on the electric-power supply route from the AC adapter 4 to the calculation processing unit 11, and it is on the side of the AC adapter 4 from the intersection point with the electric-power supply route from the AC adapter 2. In the diode 22, the anode-side terminal is provided to face the AC adapter 4, and the cathode-side terminal is provided to face the calculation processing unit 11. That is, the diode 22 flows currents from the side of the AC adapter 4 to the calculation processing unit 11, and it prevents currents from flowing from the side of the calculation processing unit 11 to the AC adapter 4. The electric-power supply route from the AC adapter 4 to the calculation processing unit 11 via the diode 22 is an example of a "second supply route".

Figure 2:
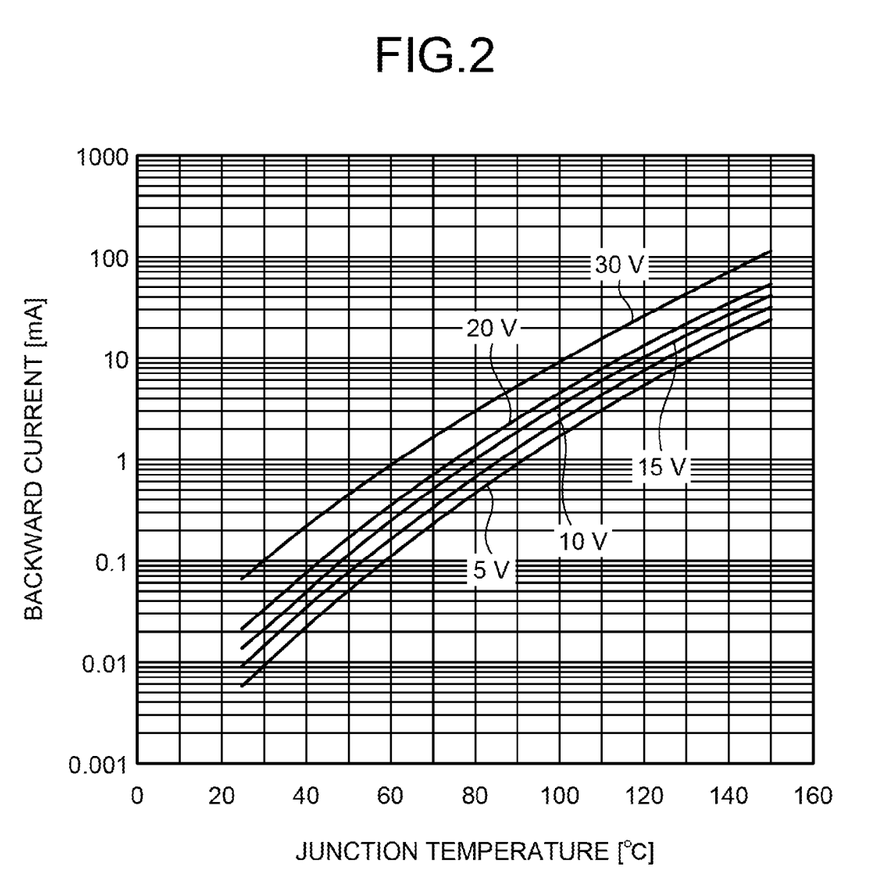
FIG. 2 is a graph that illustrates an example of the relationship between the leak current of a Schottky barrier diode and the temperature.

Here, with reference to FIG. 2, an explanation is given of the relationship between the leak current of a Schottky barrier diode and the temperature. FIG. 2 is a graph that illustrates an example of the relationship between the leak current of a Schottky barrier diode and the temperature. In FIG. 2, the vertical axis represents the current value of the backward current, and the horizontal axis represents the junction temperature of the Schottky barrier diode. Furthermore, each curve in FIG. 2, sequentially from the top, represents a case where the voltage of 30 V, 20 V, 15 V, 10 V, or 5 V is applied to the Schottky barrier diode in the backward direction.

The Schottky barrier diode has large leak currents when the voltage is applied in the backward direction. Furthermore, as illustrated in FIG. 2, regardless of the voltage applied in the backward direction, the backward current increases due to an increase in the temperature.

That is, as the temperature increases, there is an increase in the leak current of the diode 21, which is a Schottky barrier diode. Therefore, due to the leak current of the diode 21, there is a possibility that the voltage applied to the detecting unit 30 exceeds a threshold voltage of the AC adapter 2 when the temperature increases without changing the impedance between the anode side and the ground, although it is lower than the threshold voltage in the low-temperature state. Therefore, according to the present embodiment, the impedance between the anode side and the ground is changed in accordance with an increase in the temperature, as described below, so that the voltage applied to the detecting unit 30 due to the leak current of the diode 21 in the high temperature is reduced so as to be less than the threshold voltage.

The resistor 101 is provided on the route that connects the diode 21 and the ground. Hereafter, the resistance value of the resistor 101 is R1. For example, R1 is set to 82 kΩ. The resistor 101 is an example of a "first resistor".

The resistor 102 is provided on the route that connects the diode 21 and the ground in parallel to the resistor 101. The route, connecting the diode 21 and the ground via the resistor 102, is connected when a switch 46 is turned on, and it is disconnected when the switch 46 is turned off. Hereafter, the resistance value of the resistor 102 is R2. For example, R2 is set to 4.7 kΩ). The resistor 102 is an example of a "second resistor".

If the switch 46 is off, a state is obtained such that only the resistor 101 is provided between the diode 21 and the ground. Here, the current value of the backward current of the diode 21 is Ir. If the switch 46 is off, the voltage of the route that connects the diode 21 and the AC adapter 2 is Ir×R1 (V).

Furthermore, if the switch 46 is on, a state is obtained such that the resistor 101 and the resistor 102 are arranged in parallel between the diode 21 and the ground. In this case, the combined resistance of the resistor 101 and the resistor 102 is R1R2/(R1+R2). That is, if the switch 46 is on, the voltage of the route that connects the diode 21 and the AC adapter 2 is Ir×R1R2/(R1+R2).

The resistance control unit 40 turns on the switch 46 if the temperature becomes equal to or greater than a predetermined threshold temperature. Conversely, if the temperature becomes less than the threshold temperature, the resistance control unit 40 turns off the switch 46. A detailed explanation is given below of the resistance control unit 40.

The resistance control unit 40 includes resistors 41, 42, and 43, a thermistor 44, a comparator 45, and the switch 46.

The resistor 42 receives an input of the positive power-supply voltage at one end. Furthermore, the other end of the resistor 42 is connected to the resistor 41. The opposite end of the resistor 42, from the side that is connected to the resistor 41, is connected to the ground. Furthermore, according to the present embodiment, the resistor 41 and the resistor 42 have the same resistance value.

Furthermore, the route that connects the resistor 41 and the resistor 42 is bifurcated in midstream and is connected to the negative input terminal of the comparator 45. That is, the voltage that is divided by the resistors 41 and 42 from the positive power-supply voltage is input to the comparator 45. Here, if the resistance value of the resistor 41 is R11, the resistance value of the resistor 42 is R12, and the positive power-supply voltage is VCC, the voltage that is input to the comparator 45 is VCC×R11/(R11+R12). Hereafter, the voltage that is divided by the resistors 41 and 42 and is input to the comparator 45 is referred to as the "switch reference voltage". The switch reference voltage is a "switch threshold voltage" for determining whether the switch is on or off.

The thermistor 44 is a Negative Temperature Coefficient (NTC) thermistor. Specifically, as the temperature increases, the resistance of the thermistor 44 is reduced. The thermistor 44 has the same resistance value as that of the resistor 42 at the threshold temperature. The opposite end of the resistor 43, from the side that is connected to the thermistor 44, is connected to the ground. Furthermore, the resistor 43 has the same resistance value as that of the resistor 41.

Furthermore, the route that connects the resistor 43 and the thermistor 44 is bifurcated in midstream and is connected to the positive input terminal of the comparator 45. That is, the voltage that is divided by the resistor 43 and the thermistor 44 from the positive power-supply voltage is input to the comparator 45. Here, if the resistance value of the resistor 43 is R13 ($\Omega$) and the resistance value of the thermistor 44 is RT ($\Omega$), the voltage that is input to the comparator 45 is VCC×R13/(R13+RT). Specifically, as the resistance value of the thermistor 44 is decreased, the voltage that is input to the comparator 45 is reduced. Hereafter, the voltage that is divided by the resistor 43 and the thermistor 44 and is input to the comparator 45 is referred to as the "switch voltage".

Here, the resistor 41 and the resistor 43 have the same resistance value, and the thermistor 44 has the same resistance value as that of the resistor 42 at the threshold temperature; therefore, the switch voltage becomes equal to or more than the switch reference voltage at equal to or more than the threshold temperature.

The comparator 45 is an operational amplifier comparator. The comparator 45 receives an input of the switch reference voltage at the negative input terminal. Furthermore, the comparator 45 receives an input of the switch voltage at the positive input terminal.

Furthermore, the comparator 45 subtracts the switch reference voltage from the switch voltage, multiplies the subtraction result by the positive power-supply voltage for amplification, and outputs it. That is, if the value that is obtained by subtracting the switch reference voltage from the switch voltage is positive, the comparator 45 outputs the signal that has a positive value. Here, the positive value includes 0. Hereafter, the signal that has the positive value is referred to as a "high signal". Furthermore, if the value that is obtained by subtracting the switch reference voltage from the switch voltage is negative, the comparator 45 outputs the signal that has a negative value. Hereafter, the signal that has the negative value is referred to as a "low signal".

In other words, if the switch voltage is equal to or more than the switch threshold voltage, the comparator 45 outputs a high signal. Furthermore, if the switch voltage is less than the switch threshold voltage, the comparator 45 outputs a low signal.

Here, as described above, the switch voltage matches the switch reference voltage at the threshold temperature, and the switch voltage becomes higher than the switch reference voltage at more than the threshold temperature. Specifically, the comparator 45 outputs a high signal at equal to or more than the threshold temperature and outputs a low signal at less than the threshold temperature.

The switch 46 is turned off when it receives an input of the low signal from the comparator 45. Furthermore, the switch 46 is turned on when it receives an input of the high signal.

Therefore, the switch 46 is turned on at equal to or more than the threshold temperature, and the switch 46 is turned off at less than the threshold temperature.

As described above, the resistance value between the anode of the diode 21 and the ground at less than the threshold temperature is the resistance value of the resistor 101, and the resistance value between the anode of the diode 21 and the ground at equal to or more than the threshold temperature is the resistance value of the combined resistance of the resistor 101 and the resistor 102. Therefore, the resistance value between the anode of the diode 21 and the ground is decreased at equal to or more than a predetermined temperature.

The detecting unit 30 detects whether the AC adapter 2 is connected to the PC 1. Specifically, the detecting unit 30 includes a comparator 31, a reference voltage source 32, and a notifying unit 33.

The reference voltage source 32 outputs, to the comparator 31, the reference voltage that is the threshold voltage for determining whether the AC adapter 2 is connected or not. For example, the reference voltage source 32 outputs 15 V as the reference voltage so that the threshold voltage becomes 15 V.

The comparator 31 is an operational amplifier comparator. The comparator 31 receives an input of the reference voltage from the reference voltage source 32 at the negative input terminal. Furthermore, the comparator 31 receives an input of the voltage between the AC adapter 2 and the diode 21 at the positive input terminal. Hereafter, an input of the voltage between the AC adapter 2 and the diode 21 is referred to as the "detection voltage".

Furthermore, the comparator 31 subtracts the reference voltage from the detection voltage, multiplies the subtraction result by the positive power-supply voltage for amplification, and outputs it to the notifying unit 33. That is, if the value that is obtained by subtracting the reference voltage from the detection voltage is positive, the comparator 31 outputs the signal that has a positive value to the notifying unit 33. Here, the positive value includes 0. Hereafter, the signal that has the positive value is referred to as a "high signal". Furthermore, if the value that is obtained by subtracting the reference voltage from the detection voltage is negative, the comparator 31 outputs the signal that has a negative value to the notifying unit 33. Hereafter, the signal that has the negative value is referred to as a "low signal".

In other words, if the detection voltage is equal to or more than the threshold voltage, the comparator 31 outputs a high signal. Furthermore, if the detection voltage is less than the threshold voltage, the comparator 31 outputs a low signal.

When the notifying unit 33 receives an input of the high signal from the comparator 31, it detects that the AC adapter 2 is connected to the PC 1 and notifies the operator that the AC adapter is connected. Furthermore, when the notifying unit 33 receives an input of the low signal from the comparator 31, it detects that the AC adapter 2 has been removed from the PC 1. Here, the notifying unit 33 may notify the operator that the AC adapter 2 has been removed from the PC 1.

Here, if the AC adapter 4 is not connected, the backward current does not flow into the diode 21. In this case, if the AC adapter 2 is not connected, the voltage between the diode 21 and the AC adapter 2 is 0 or an low voltage. In such a case, as the detection voltage is less than the threshold voltage, the detecting unit 30 detects that the AC adapter 2 is not connected to the PC 1.

Furthermore, if the AC adapter 2 is connected while the AC adapter 4 is not connected, the voltage between the diode 21 and the AC adapter 2 is the voltage of the electricity that is supplied from the AC adapter 2. In this case, as the detection voltage is equal to or more than the threshold voltage, the detecting unit 30 detects that the AC adapter 2 is connected to the PC 1.

Furthermore, if both the AC adapters 2 and 4 are connected to the PC 1, the electricity is supplied from the AC adapter 2; therefore, the leak current does not occur in the diode 21. Thus, the voltage between the diode 21 and the AC adapter 2 is the voltage of the electricity that is supplied from the AC adapter 2. In this case, as the detection voltage is equal to or more than the threshold voltage, the detecting unit 30 detects that the AC adapter 2 is connected to the PC 1.

Next, an explanation is given of a case where the AC adapter 2 is not connected to the PC 1 and the AC adapter 4 is connected to it. As the AC adapter 2 is not connected, the leak current occurs in the diode 21 due to the electricity that is supplied from the AC adapter 4.

Here, consideration is given to the case where the temperature is less than a predetermined value. In such a case, the resistance value of the route that connects the anode of the diode 21 and the ground is the resistance value R1 of the resistor 101. Therefore, the voltage of the route between the diode 21 and the AC adapter 2 is the value that is obtained by multiplying the leak current by the resistance value R1 of the resistor 101. That is, the voltage of the route between the diode 21 and the AC adapter 2 is represented as Ir×R1.

In this case, the resistance value R1 of the resistor 101 is a large value so as to suppress the standby electricity. For example, R1=82 kΩ). In this case, the standby electricity is 19×19/82 k=4.4 mW in a condition other than at the high temperature that exceeds the threshold temperature (hereafter, referred to as "at the normal temperature"), and the standby electricity at the normal temperature is suppressed so as to be sufficiently lower than the regulatory value.

Furthermore, in the case of the normal temperature, the leak current of the diode 21 is small. Therefore, even if R1 is large, Ir×R1 is kept at a small value, and false detection of the detecting unit 30 may be prevented.

Next, consideration is given to the case where the temperature is equal to or more than a predetermined value. In this case, the resistance value of the route that connects the anode of the diode 21 and the ground is the resistance value of the combined resistance of the resistor 101 and the resistor 102. Therefore, the voltage of the route between the diode 21 and the AC adapter 2 has the value that is obtained by multiplying the leak current by the resistance value of the combined resistance of the resistor 101 and the resistor 102. That is, the voltage of the route between the diode 21 and the AC adapter 2 is represented as Ir×R1R2/(R1+R2). Here, in the case of the high-temperature condition, the leak current of the diode 21 is large. However, in this case, the resistance value of the route that connects the anode of the diode 21 and the ground is small, compared to the resistance value in the case of the normal-temperature condition. Therefore, even if Ir is large, Ir×R1R2/(R1+R2) is kept at a small value, and false detection of the detecting unit 30 may be prevented.

For example, R2=4.7 kΩ. In this case, the combined resistance is about 4.4 kΩ and, if the threshold voltage for AC adapter detection is 15 V, the leak current is about 15/4.4 k=3.4 mA, whereby it may fall within the acceptable range.

Here, according to the present embodiment, the resistance value of the resistor 101 is, for example, 82 kΩ, and the resistance value of the resistor 102 is, for example, 4.7 kΩ; however, it is preferable that the resistance values are determined depending on the characteristics or the assured temperature of the used diode 21, the voltage of an external power source to be detected, or the like.

Figure 3:
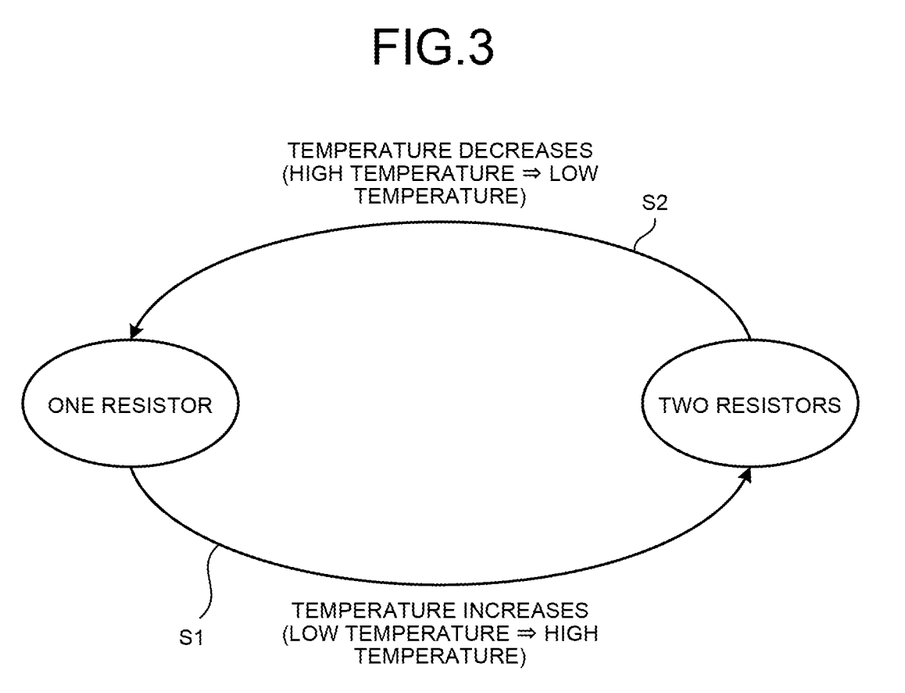
FIG. 3 is a diagram that illustrates the outline of an operation to control the resistance in accordance with a change in temperature.

Next, an explanation is given of the flow of an operation to control the resistance in accordance with a change in the temperature. First, with reference to FIG. 3, an explanation is given of the overall flow of an operation to control the resistance in accordance with a change in the temperature by a personal computer according to the present embodiment. FIG. 3 is a diagram that illustrates the outline of an operation to control the resistance in accordance with a change in temperature.

As illustrated in FIG. 3, if the temperature increases and the low temperature changes to a high temperature, the temperature becomes equal to or more than the threshold temperature. In this case, the resistance control unit 40 turns on the switch 46 so that the resistor in the route that connects the anode of the diode 21 and the ground is switched from one to two, i.e., from only the resistor 101 to the resistors 101 and 102 (Step S1). Thus, the resistance value of the resistor in the route that connects the anode of the diode 21 and the ground is decreased; therefore, even if the leak current of the diode 21 is large, the detecting unit 30 may prevent false detection of the AC adapter 2.

Furthermore, if the temperature decreases so that the high temperature changes to a low temperature, including the normal temperature, the temperature becomes less than the threshold temperature. In this case, the resistance control unit 40 turns off the switch 46 so that the resistor in the route that connects the anode of the diode 21 and the ground is switched from two to one, i.e., from the resistors 101 and 102 to only the resistor 101 (Step S2). Thus, the resistance value of the resistor in the route that connects the anode of the diode 21 and the ground is increased, and the standby electricity may be suppressed. Furthermore, in this case, even if the resistance value of the resistor in the route that connects the anode of the diode 21 and the ground is high, as the leak current is small, the detecting unit 30 may prevent false detection of the AC adapter 2.

Figure 4:
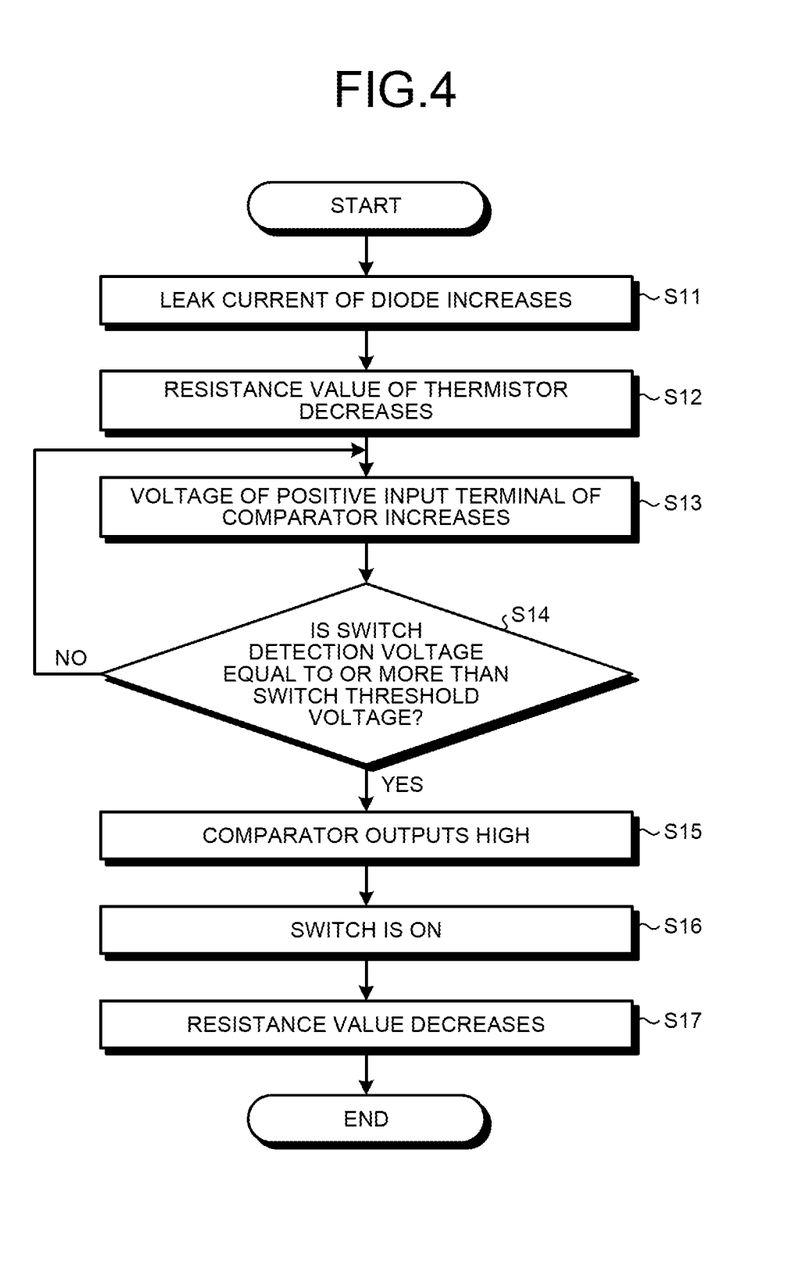
FIG. 4 is a flowchart of the operation to control the resistance when the temperature increases.

Next, with reference to FIG. 4, an explanation is given of the flow of an operation to control the resistance when the temperature increases. FIG. 4 is a flowchart of the operation to control the resistance when the temperature increases. The operation illustrated in FIG. 4 is an example of the operation at Step S2 of FIG. 3.

In the diode 21, the leak current increases in accordance with a rise in the temperature (Step S11). If this goes on, the voltage of the route between the diode 21 and the AC adapter 2 increases due to the increase in the leak current, and there is a possibility that the detecting unit 30 improperly detects the AC adapter 2. Therefore, in order to prevent false detection of the AC adapter 2, the personal computer according to the present embodiment performs the following operation.

The resistance value of the thermistor 44 decreases due to an increase in the temperature (Step S12).

When the resistance value of the thermistor 44 decreases, the voltage divided by the resistor 43 and the thermistor 44 increases, and the voltage of the positive input terminal of the comparator 45 increases (Step S13).

The comparator 45 determines whether a switch detection voltage, which is the voltage that is input to the positive input terminal, is equal to or more than a switch reference voltage, which is the voltage that is input to the negative input terminal, i.e., the switch threshold voltage (Step S14). If the switch detection voltage is less than the switch threshold voltage (Step S14: No), the comparator 45 continuously outputs the low signal, meanwhile the operation returns to Step S13.

Conversely, if the switch detection voltage is equal to or more than the switch threshold voltage (Step S14: Yes), the comparator 45 outputs the high signal (Step S15).

The switch 46 is turned on when it receives an input of the high signal from the comparator 45 (Step S16).

When the switch 46 is turned on, the resistor 42 is added in parallel to the resistor 41 in the route that connects the anode of the diode 21 and the ground and therefore the resistance value decreases (Step S17). Thus, even if the leak current of the diode 21 increases, an increase in the voltage of the route between the diode 21 and the AC adapter 2 is suppressed, and false detection of the AC adapter 2 by the detecting unit 30 is prevented.

Figure 5:
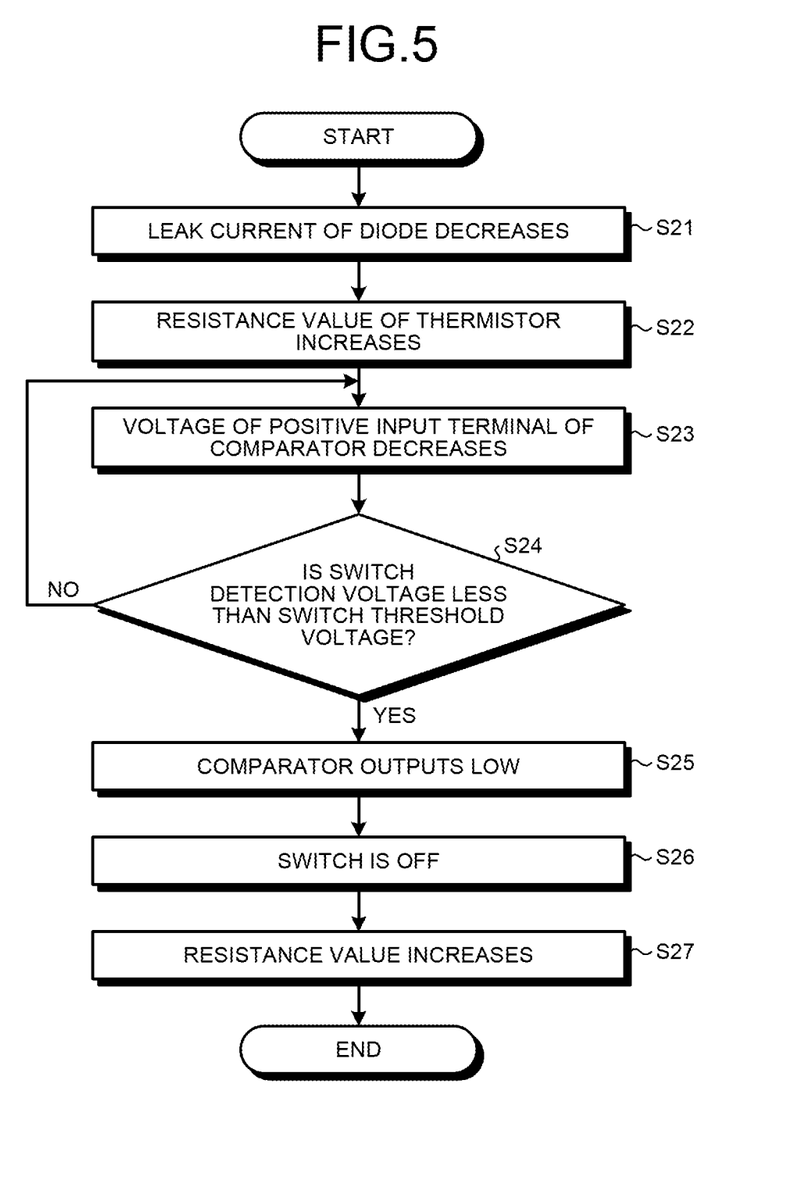
FIG. 5 is a flowchart of the operation to control the resistance when the temperature decreases.

Next, with reference to FIG. 5, an explanation is given of the flow of an operation to control the resistance when the temperature decreases. FIG. 5 is a flowchart of the operation to control the resistance when the temperature decreases. The operation illustrated in FIG. 5 is an example of the operation at Step S1 of FIG. 3.

In the diode 21, the leak current decreases in accordance with a fall in the temperature (Step S21). If this goes on, the standby electricity is continuously large although the risk of false detection of the AC adapter is reduced. Therefore, in order to reduce the standby electricity, the personal computer according to the present embodiment performs the following operation.

The resistance value of the thermistor 44 increases due to a decrease in the temperature (Step S22).

When the resistance value of the thermistor 44 increases, the voltage divided by the resistor 43 and the thermistor 44 decreases, and the voltage of the positive input terminal of the comparator 45 decreases (Step S23).

The comparator 45 determines whether the switch detection voltage, which is the voltage that is input to the positive input terminal, is less than the switch reference voltage, which is the voltage that is input to the negative input terminal, i.e., the switch threshold voltage (Step S24). If the switch detection voltage is equal to or more than the switch threshold voltage (Step S24: No), the comparator 45 continuously outputs the high signal, meanwhile the operation returns to Step S23.

Conversely, if the switch detection voltage is less than the switch threshold voltage (Step S24: Yes), the comparator 45 outputs the low signal (Step S25).

The switch 46 is turned off when it receives an input of the low signal from the comparator 45 (Step S26).

When the switch 46 is turned off, the resistor 42 is removed from the route that connects the anode of the diode 21 and the ground; therefore, the resistance value increases (Step S27). Thus, the standby electricity is suppressed.

Figure 6:
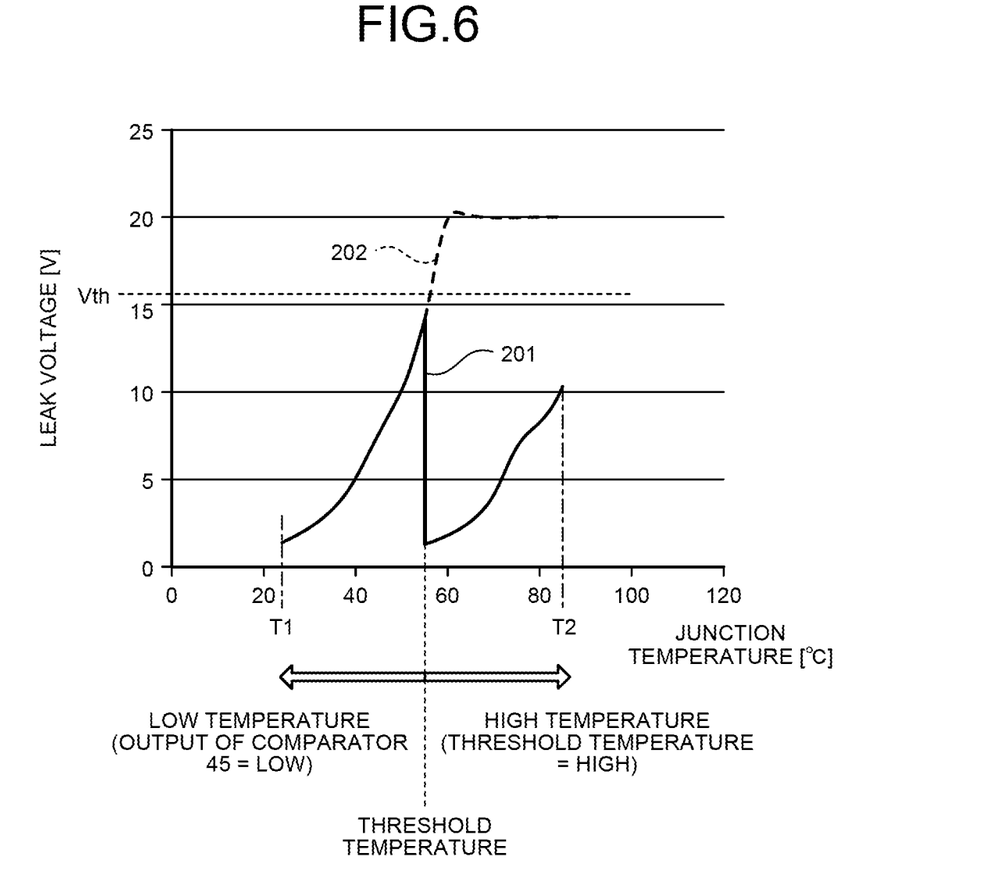
FIG. 6 is a graph that illustrates the relationship between the temperature and the leak voltage in the personal computer according to the present embodiment.

Next, with reference to FIG. 6, an explanation is given of the relationship between the temperature and the leak voltage in the personal computer according to the present embodiment. FIG. 6 is a graph that illustrates the relationship between the temperature and the leak voltage in the personal computer according to the present embodiment. In FIG. 6, the vertical axis indicates the leak voltage of the diode 21, and the horizontal axis indicates the junction temperature of the diode 21.

FIG. 6 illustrates the transition of the leak voltage in a case where the junction temperature is increased. T1 in FIG. 6 represents the start temperature, and T2 represents the termination temperature. Furthermore, Vth represents the threshold voltage for detecting the AC adapter 2. Furthermore, a graph 201, indicated by the solid line, represents changes in the leak voltage in a case where the resistance control unit 40 according to the embodiment is provided. Moreover, a graph 202, indicated by the dotted line, represents changes in the leak voltage in a case where the resistance control unit 40 is not provided and only the resistor 101 is provided between the anode of the diode 21 and the ground.

When the junction temperature is between the start temperature T1 and the threshold temperature, the comparator 45 outputs the low signal. Thus, the switch 46 is off, and there is only the resistor 101 between the anode of the diode 21 and the ground; therefore, the graph 201 and the graph 202 have the same curve.

When the threshold temperature is reached, the comparator 45 starts to output the high signal. Thus, the switch 46 is turned on, the resistor 102 is added in parallel to the resistor 101, and the resistance value between the anode of the diode 21 and the ground is decreased. Therefore, in the graph 201, the leak voltage of the diode 21 is decreased, and it is prevented from being equal to or more than the threshold voltage Vth.

Afterward, the comparator 45 outputs the high signal from the threshold temperature to the termination temperature T2. Thus, the switch 46 keeps the on state and, as illustrated in the graph 201, the leak voltage gradually increases from the voltage value that has been dropped at the threshold temperature. In this case, the leak voltage does not exceed the threshold even if it reaches the termination temperature T2 that is more than 80° C., and it is understood that false detection of the AC adapter 2 may be prevented without fail in the range of use of typical computers.

Conversely, if the resistance control unit 40 is not provided, the resistance value between the anode of the diode 21 and the ground does not change. Therefore, the leak voltage continuously increases and, as illustrated in the graph 202, the leak voltage exceeds the threshold voltage Vth. In this case, false detection of the AC adapter 2 occurs.

As described above, in the electronic device according to the present embodiment, if the temperature exceeds the threshold temperature, a resistor is added in parallel in the route between the ground and the anode of the rectifying device, provided in the route of the AC adapter. Thus, even if the temperature increases and the large leak current occurs, the voltage between the AC adapter and the rectifying device may be suppressed so as to be low, and false detection of the AC adapter may be properly prevented.

Furthermore, in the case of other than the high-temperature condition that exceeds the threshold temperature, the resistance is increased in the route between the ground and the anode of the rectifying device, arranged in the route of the AC adapter; therefore, the standby electricity may be suppressed so as to be low, and the standby electricity regulations, such as the Erp regulation, may be satisfied.

Here, in the above descriptions, an explanation is given of a case where the docking station, including a keyboard, or the like, is an expansion unit, to which the PC is connected; however, other configurations may be used as long as the mechanism provides a different electric-power supply route other than the electric-power supply route of the single AC adapter to the PC. For example, the expansion unit may be a simple charger.

Furthermore, in the above descriptions, an explanation is given by using the PC as an example; however, the resistance control mechanism, explained in the embodiment, may be implemented in different electronic devices as long as the electronic device includes the supply route for a different external power source, connected with a diode OR circuit.

Furthermore, in the above descriptions, an explanation is given by using the Schottky barrier diode, for example, as the diode to handle large current; however, the same advantage may be achieved by installing the resistance control mechanism, explained in the embodiment, in a diode that has large leak current or a structure that has large leak current.

Furthermore, according to the present embodiment, the resistance control mechanism is provided in one of the electric-power supply routes of the external power sources in dual system; however, it may be provided in each of them and, if there are electric-power supply routes of two or more external power sources, the resistance control mechanism may be provided in all or some of them.

Furthermore, according to the present embodiment, the configuration is such that the single resistor is arranged in parallel; however, this is not a limitation, and the configuration may be such that multiple resistors with different resistance values are arranged in parallel in accordance with the temperature. In that case, for example, each resistor may be arranged in parallel together with a switch, and each switch may be turned on/off by a comparator that uses a different switch threshold voltage in accordance with the temperature for switching.

Furthermore, according to the present embodiment, the switch is changed by the analog circuit; however, the configuration may be such that the temperature is detected by a temperature sensor and on/off of the switch is controlled by a CPU, or the like.

According to an aspect of the electronic device and the electronic-device control method, disclosed in the subject application, there are advantages such that the standby electricity may be suppressed and false detection of an external power source may be easily prevented.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention have been described in detail, it should be understood that the various changes, substitutions, and alterations could be made hereto without departing from the spirit and scope of the invention.

What is claimed is:

1. An electronic device comprising:
    a rectifying device that is provided in a first supply route for an electric power from a first external power source, rectifies a current from the first external power source and, at an output side thereof, is connected to a second supply route for an electric power from a second external power source;
    a detecting unit that is connected to an input side of the rectifying device in the first supply route and, based on a voltage that is input from the first supply route, detects whether the first external power source is connected; and
    a resistance control unit that reduces a combined resistance between a ground and the input side of the rectifying device when a temperature of a device, including the rectifying device, is equal to or more than a predetermined temperature.

2. The electronic device according to claim 1, wherein the resistance control unit reduces a combined resistance by adding a second resistor in parallel to a first resistor that is provided between the ground and the input side of the rectifying device.

3. The electronic device according to claim 1, wherein the resistance control unit compares a predetermined voltage and a divided voltage that passes through a thermistor whose resistance value becomes equal to or less than a predetermined value at equal to or more than the predetermined temperature, detects that the temperature of the device is equal to or more than the predetermined temperature when the divided voltage exceeds the predetermined voltage, and reduces the combined resistance when it is detected that the temperature of the device is equal to or more than the predetermined temperature.

4. An electronic-device control method comprising:
    reducing a combined resistance between a ground and an input side of a rectifying device when a temperature of a device, including the rectifying device, is equal to or more than a predetermined temperature, the rectifying device being provided in a first supply route for an electric power from a first external power source, rectifying a current from the first external power source and, at an output side thereof, being connected to a second supply route for an electric power from a second external power source; and
    detecting whether the first external power source is connected based on a voltage on the input side of the rectifying device in the first supply route.

* * * * *